United States Patent
Bondy

(10) Patent No.: US 7,206,084 B2
(45) Date of Patent: Apr. 17, 2007

(54) DOCUMENT PROCESSING SYSTEM

(75) Inventor: Thomas L Bondy, Canton, MI (US)

(73) Assignee: Unisys Corporation, Blue Bell, PA (US)

(*) Notice: Subject to any disclaimer, the term of this patent is extended or adjusted under 35 U.S.C. 154(b) by 767 days.

(21) Appl. No.: 10/285,327

(22) Filed: Oct. 31, 2002

(65) Prior Publication Data
US 2004/0085566 A1 May 6, 2004

(51) Int. Cl.
G06F 15/00 (2006.01)
H04N 1/04 (2006.01)

(52) U.S. Cl. .................. 358/1.14; 358/498; 358/1.15; 399/19; 399/21

(58) Field of Classification Search ............... 358/1.14, 358/1.15, 498; 700/90; 399/9, 10, 19, 21
See application file for complete search history.

(56) References Cited

U.S. PATENT DOCUMENTS 4,358,016 A * 11/1982 Richardson et al. ........ 209/564
6,151,132 A * 11/2000 Urquhart et al. ........... 358/1.14
6,438,433 B1 * 8/2002 Gawne ........................ 700/90

OTHER PUBLICATIONS

Dictionary.com, http://dictionary.refernce.com/search?q=sequence.*

* cited by examiner

Primary Examiner—Kimberly Williams
Assistant Examiner—Scott A. Schlack
(74) Attorney, Agent, or Firm—Mark T. Starr; Brooks Kushman PC

(57) ABSTRACT

A document processing system where system software interfaces with transport hardware is provided. A medium stores the system software which includes an API for application software. The system software further includes instructions for a track control module and an exception handler. The track control module creates an object for each read document. The object reports document completion to the application software. The application software requires that document completions be reported in the same order in which the objects were created. When a document jam occurs, the track control module identifies all documents involved in the jam, and for each document involved in the jam the track control module checks if all operations are complete and if the document entered the correct pocket, and sets a flag if both events are true. The exception handler hides the documents involved in the jam that have a set flag, but displays the others.

2 Claims, 3 Drawing Sheets

DOCUMENT PROCESSING SYSTEM

BACKGROUND OF THE INVENTION

1. Field of the Invention

The present invention relates to document processing systems, to a system software interface that enables the same application software to be used across multiple document processing systems, and to improved jam recovery for document processing systems.

2. Background Art

A typical document processing system for feeding and transporting documents includes a feeder and a separator in the document feeding portion of the system, and a series of roller pairs or belts in the document transporting portion of the system. In the feeding portion of the system, the feeder acts with the separator to feed documents singly, in order, from a stack. In the transporting portion of the system, the roller pairs and/or belts convey the documents, one at a time, past other processing devices such as readers, printers, and sorters that perform operations on the documents. The feeder is typically a feed wheel, but may take other forms. The separator may be a wheel, but also may take other forms such as a belt. Further, the components in the transporting portion of the system may take a variety of forms. Various sensors located throughout the system are used to monitor documents as they pass through the system in a known manner.

Existing document processing systems include the Unisys Network Document Processor (NDP) 850, 1150, 1600, 1825, and 2000. Among other features, the NDP 850-2000 are capable of sorting documents into pockets and include an 8-pocket module, and additional pockets can be added in increments of 8, with a maximum of 40 for the NDP 850/1150 and 48 for the NDP 1600-2000.

The Unisys NDP document processors include the transport hardware and include system software that interfaces with the transport hardware to provide document tracking control. The system software includes a system software interface. The system software interface is a common application programming interface that enables the same application software to be used across multiple Unisys transports.

In existing document processors, throughput is measured by the number of items processed in a given time. When a document jam occurs, feeding must be stopped, and the operator manually handles the jammed document and each document that left the feeder after the jammed document had left the feeder. The current jam recovery procedure is very time consuming and degrades the throughput. An improvement in overall throughput can be achieved by reducing the time that the operator spends recovering from a jam or missort. In many instances, the operator is wasting time by validating that documents have been correctly pocketed, but current jam recovery procedure requires that the operator manually handle the jammed document and each document that left the feeder after the jammed document had left the feeder. Time can be saved if the operator is not required to search for documents that have been successfully processed and pocketed correctly.

In existing system software, a track control module monitors the transport hardware and when a document passes the reader and data is available, the track control module assigns or reads the tracking number of this item. An object is created within the system software that monitors the progress of this item from device to device until the document is pocketed and reports document complete to the application software through the common application programming interface.

The application software is expecting document completes to be returned in the order in which the objects were created. With existing system software, when a document jam occurs, the track control module will identify all documents from the first document involved in the missort or jam as being in an error state that requires the operator to manually recover. If a jam occurs in a pocket module it is likely that some documents following the current item may be pocketed correctly. The likelihood of this occurring is greater the further down the track the jam occurs. In the case of a missort, since documents that are in the track continue to run out, the likelihood of some of these documents reaching their correct pockets is very high. The existing system software will require that the operator validate all documents from the first document involved, including the validation of documents that had in fact been processed and pocketed correctly.

For the foregoing reasons, there is a need for a document processing system with improved jam recovery.

SUMMARY OF THE INVENTION

It is, therefore, an object of the present invention to provide a document processing system that does not require that the operator validate documents that have been correctly pocketed during a jam recovery procedure and that still returns document completes from the system software to the application software in the order in which the objects were created.

In carrying out the above object, a document processing system of the type in which system software interfaces with transport hardware to provide tracking control is provided. The transport hardware includes various sensors located throughout the system to monitor documents as they pass through the system. The system includes a computer readable storage medium storing the system software. The system software interfaces with the transport hardware and includes a system software application programming interface that enables application software to hook into the system software. The system software on the medium further comprises instructions for a track control module and instructions for an exception handler. The track control module monitors the transport hardware to create an object for each read document. The object reports document completion to the application software when the document is pocketed and all exception processing is complete. The application software requires that the document completions be reported in the same order in which the objects were created. When a document jam occurs, the track control module identifies all documents involved in the jam. For each document involved in the jam the track control module checks if all operations are complete and if the document entered the correct pocket, and sets a flag if both events are true.

The exception handler indicates the documents involved in the jam as identified by the track control module to the operator for manually handling. The exception handler hides the documents involved in the jam that have a set flag. The exception handler does not require that the operator validate documents that have been correctly pocketed and still returns document completes to the application software in the order that the objects were created.

Preferably, the system further comprises a display device. The exception handler causes the documents involved in the jam as identified by the track control module to be listed on the display device to the operator for manual handling. The exception handler hides the documents involved in the jam that have a flag set.

The above object and other objects, features, and advantages of the present invention are readily apparent from the following detailed description of the preferred embodiment when taken in connection with the accompanying drawings.

DETAILED DESCRIPTION OF THE PREFERRED EMBODIMENT

A document processing system is generally indicated at 10. System 10 includes transport hardware 12. Transport hardware 12 includes various sensors located throughout the transport to monitor documents as they pass through the transport. Preferably, the various sensors provide signals to a single board that includes tracking logic. The single board interfaces with the system software. System 10 is preferably a Unisys Network Document Processor (NDP) available from Unisys.

Transport 12 interfaces with the system software. The system software includes track control module 14. Track control module 14 interfaces with the transport hardware 12 via track driver 16. The system software is preferably Windows NT or Windows 2000 based system software and includes a common application programming interface (CAPI) that enables the same application software to be used across multiple transports. Preferably, the system software is the CAPI system software available from Unisys.

Figure 1:
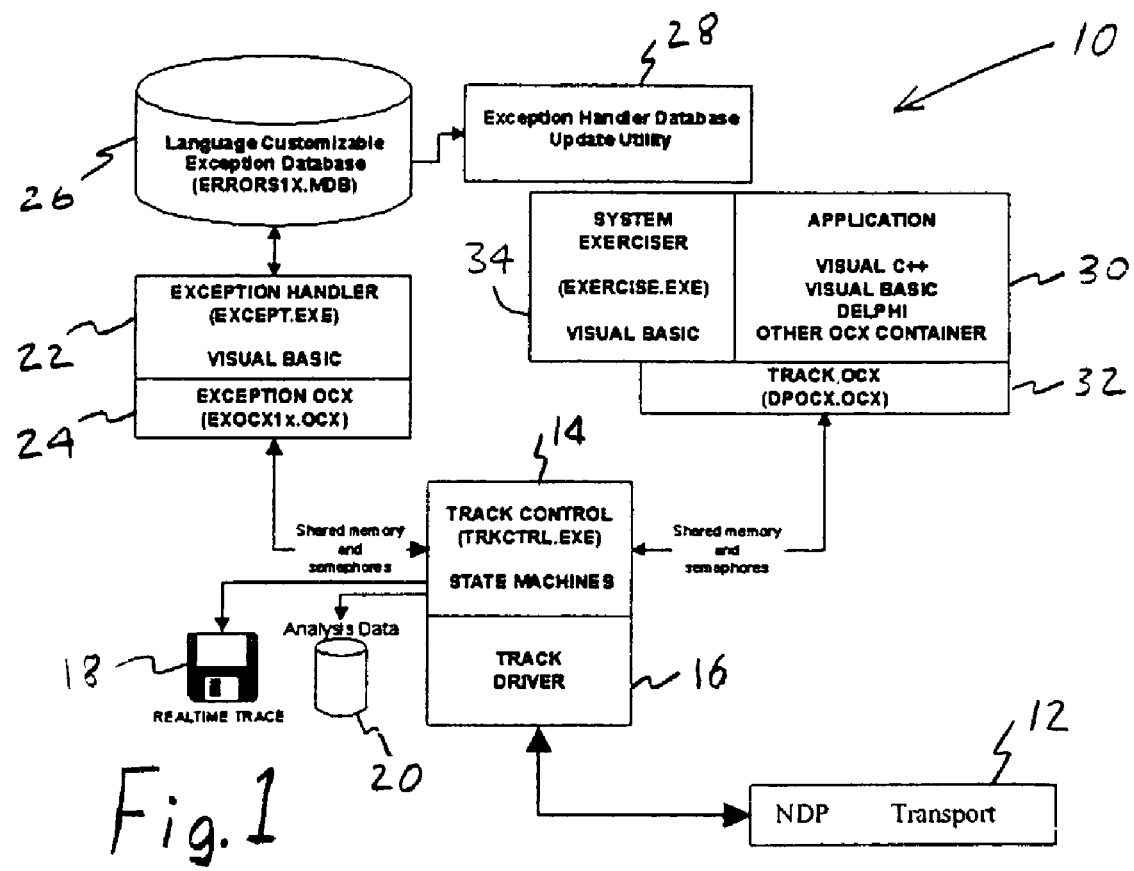
FIG. 1 illustrates a document processing system including transport hardware, system software, and application software in accordance with a preferred embodiment of the present invention.

With continuing reference to FIG. 1, track control module 14 may provide real time traces 18 or analysis data 20. The system software, in addition to including track control module 14, includes exception handler 22. Exception handler 22 communicates with track control module 14 via exception OCX 24. Objects may communicate in other ways in various implementations of the invention, for example, by using Active X controls. Exception handler 22 handles exceptions in accordance with exception database 26. Exception database 26 is updateable via exception handler database update utility 28. The system software interface is indicated at 32 and takes the form of an OCX file to define a common application programming interface that enables the same application software to be used across multiple transports that may differ in the ways that transport hardware 12, track control 14, and exception handler 22 are implemented. Application software is indicated at 30, while a system exerciser is indicated at 34. Both application software 30 and system exerciser 34 communicate with track control 14 through the common application programming interface shown as track OCX 32.

Figure 2:
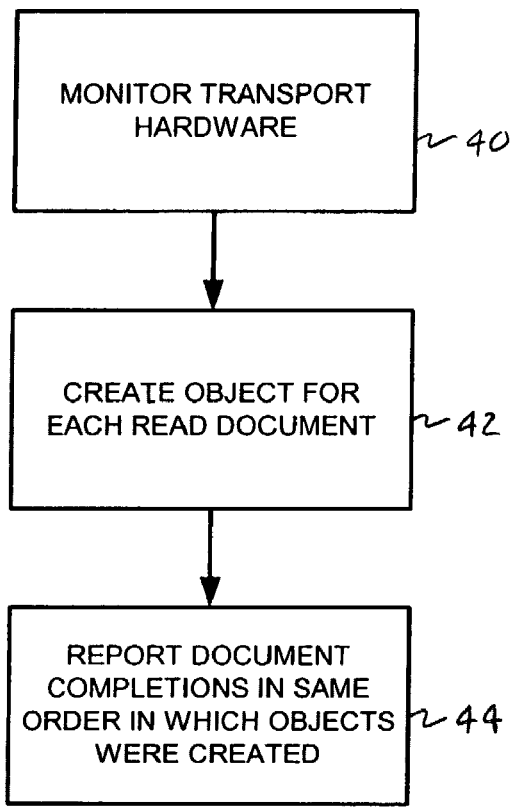
FIG. 2 illustrates general operation of the system software for the system of FIG. 1.
Figure 3:
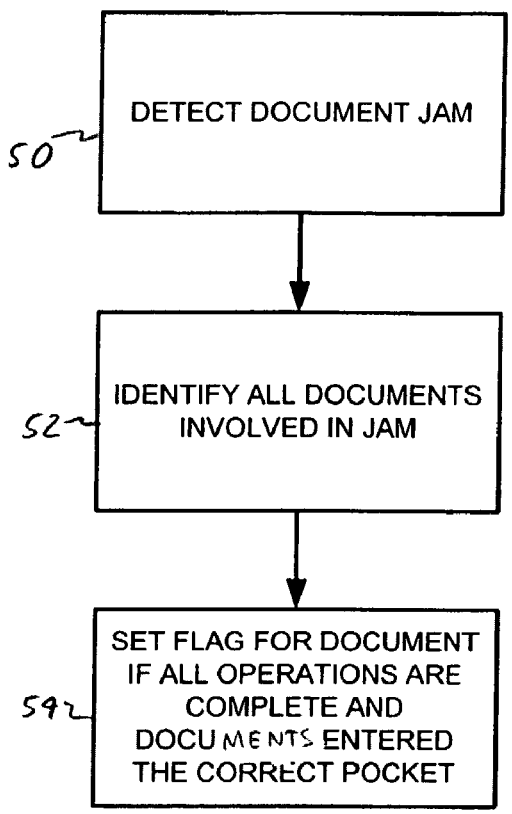
FIG. 3 illustrates document jam detection by the system software for the system of FIG. 1.
Figure 4:
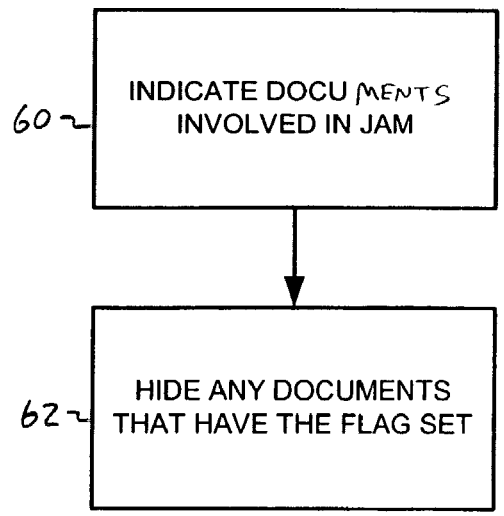
FIG. 4 illustrates indication of the documents involved in the jam by the exception handler while hiding any documents that have the flag set by the track control module for the system of FIG. 1.

FIGS. 2–4 illustrate operations of the system software. Track control module 14 monitors transport hardware 12 and when a document passes the reader and data is available, the track control module 14 assigns or reads the tracking number of this item (block 40). An object is created within the system software that monitors the progress of this item from device to device until the document is pocketed (block 42). Track control module 14 reports document completions to application software 30 through the common application programming interface 32 (block 44).

Application software 30 is expecting document completes to be returned in the order in which the objects were created. When a jam is detected (block 50), track control module 14 identifies all documents involved in the jam (block 52).

In accordance with the present invention, the track control module 14 still uses pocket entry detection from transport hardware 12 (the object created within the system software for each document is updated as the document progresses from device to device until the document is pocketed, and this pocket entry event is noted in the object). The present invention, as indicated by block 54, checks to determine (for each document identified as involved in the jam), if all the device operations are complete and if the document entered the correct pocket. If both statements are true, then track control 14 sets a flag so that exception handler 22 will hide the document so the operator does not need to manually process documents that have already been correctly pocketed. The operator only has to manually process documents involved in the jam that have not been correctly pocketed. Over time, this saves much time for the system operator and makes document processing more efficient and improves over the prior art where all jam involved documents must be manually hand-fed including validation of already pocketed documents. FIG. 4 illustrates that track control 14 indicates documents involved in the jam to exception handler 22. At block 62, exception handler 22 hides any documents that have the flag set.

Figure 5:
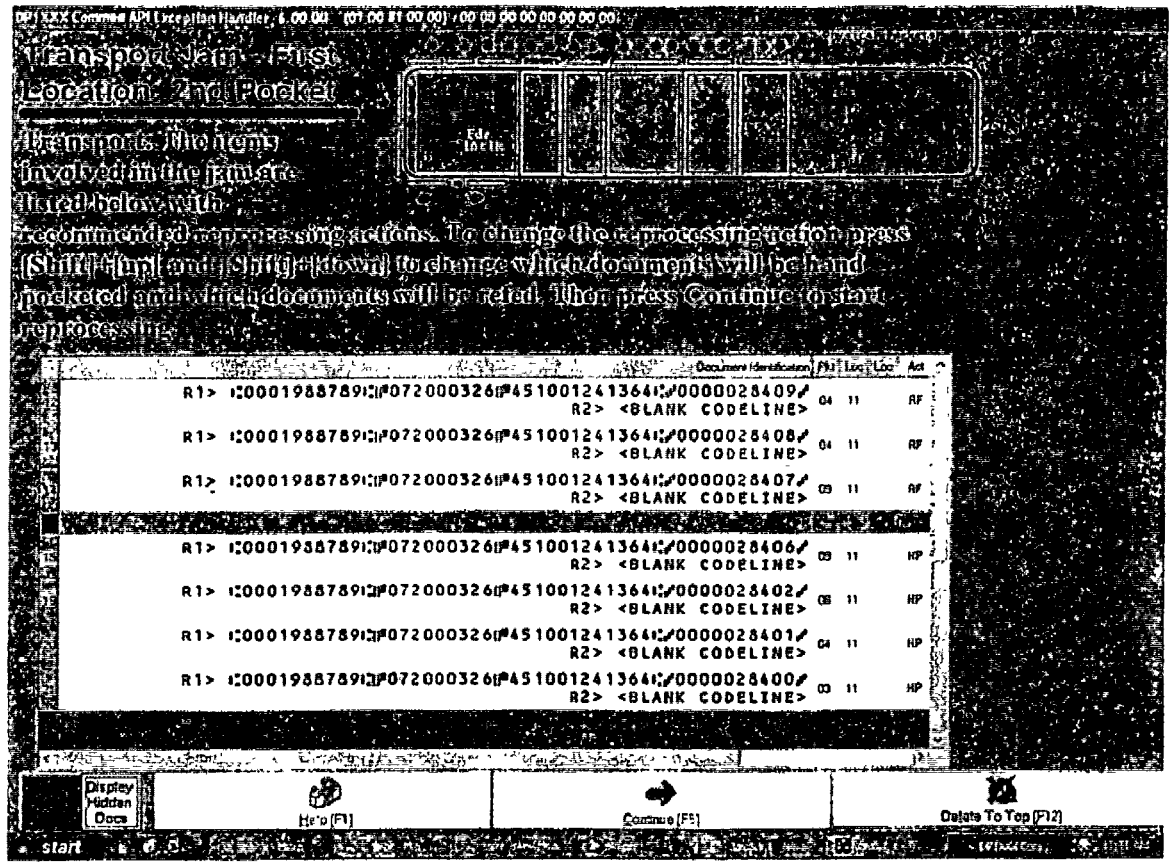
FIG. 5 illustrate a display on a display device showing documents involved in a document jam while hiding any documents that have the flag set by the track control module.

FIG. 5 illustrates a display on a display device where exception handler 22 causes documents involved in the jam as identified by the track control module 14 to be listed on the display device to the operator for manual handling. Exception handler 22 hides documents involved in the jam that have the flag set. As shown, the operator is instructed to hand-pocket or re-feed the documents involved in the jam. As shown, documents 12, 13, 14, 15, 19, 20, 21 are explicitly illustrated as involved in the jam and requiring manual handling. Documents 16-18 are hidden from display because these documents, although involved in the jam, had the flag set by the track control module, indicating that these specific documents have had all device operations completed and entered the correct pocket.

It is appreciated that FIGS. 1–5 illustrate a preferred embodiment and that embodiments of the present invention may vary in implementation. Further, a preferred embodiment of the present invention utilizes a Unisys NDP transport and CAPI software, both available from Unisys.

Further, the preferred embodiment uses the following specific technique for transmitting document disposition data to the transport.

Two registers are used to transmit document disposition data to the transport. This data consists of the pocket number and the document tracking number if it is enabled. Disposition register 2, containing the pocket number, must always be the last register transferred. Disposition register 1 contains the optional document tracking number. Even if disposition register 1 contains no data, it must be written before disposition register 2. If the MSB, REJECT, of disposition register 1 is written, the document with the tracking number in the lowest 6 bits of the register will have its pocket selection overridden and be routed to the reject pocket without stopping flow or declaring a missort. If bit 6, REJECT ALL, of disposition register 1 is written all documents in the transport prior to the reject pocket will be sent to the reject pocket, and the feeder will be stopped. A missort will not be called by the hardware on these items. If both bits are set, all items after the tracking number indicated will be sent to the reject pocket. If Bit 6, Change Pocket Number, is set in disposition register 2, the tracking number specified in disposition register 1 will have its pocket number assignment changed to the new value.

When pocket entry reporting is enabled by the application, these registers will reflect the pocket number and tracking number of the item that entered the pocket. The MSB of the pocket number will be set if that pocket is full, the next bit will be set if that pocket is almost full.

Disposition Registers

| ADDRESS FC06 - OUTPUT | INPUT |
|---|---|
| BIT 7 REJECT THIS TRACKING NUMBER | 0 |
| BIT 6 REJECT ALL DOCUMENTS | 0 |
| BIT 5 TRACKING NUMBER 32 | POCKET ENTRY TN32 |
| BIT 4 TRACKING NUMBER 16 | POCKET ENTRY TN16 |
| BIT 3 TRACKING NUMBER 8 | POCKET ENTRY TN8 |
| BIT 2 TRACKING NUMBER 4 | POCKET ENTRY TN4 |
| BIT 1 TRACKING NUMBER 2 | POCKET ENTRY TN2 |
| BIT 0 TRACKING NUMBER 1 | POCKET ENTRY TN1 |

Using this method the documents are still returned in the same order to the application so no application changes are required. The operator does not see the completed items so time is not wasted searching for the document that is already in its correct pocket. The exception handler has been modified so at the click of a button the operator can review any documents that have been hidden from view in case they need to look at them for some reason.

While embodiments of the invention have been illustrated and described, it is not intended that these embodiments illustrate and describe all possible forms of the invention. Rather, the words used in the specification are words of description rather than limitation, and it is understood that various changes may be made without departing from the sprit and scope of the invention.

What is claimed is:

1. A document processing system of the type in which system software interfaces with transport hardware to provide tracking control, the transport hardware including various sensors located throughout the system as well as various document pockets, to monitor documents as they pass through the system, the system including a computer readable storage medium storing the system software, the system software interfacing with the transport hardware and including a system software application programming interface that enables application software to hook into the system software, the system software on the medium further comprising: instructions for a track control module, the track control module monitoring transport hardware to create an object for each read document wherein the object reports document completion to the application software, wherein when a document jam occurs, the application software requires that the document completions be reported in the same order in which the objects were created, and the track control module identifies all documents involved in the jam, and wherein for each document involved in the jam the track control module checks if all operations are complete and if the document entered the correct pocket, and sets a flag if both events are true; and instructions for an exception handler, the exception handler indicating the documents involved in the jam as identified by the track control module to the operator for manually handling, wherein the exception handler hides the documents involved in the jam that have a set flag, whereby the exception handler does not require that the operator validate documents that have been correctly pocketed and still returns document completes to the application software in the order that the objects were created.

2. The system of claim 1 further comprising:
a display device wherein the exception handler causes the documents involved in the jam as identified by the track control module to be listed on the display device to the operator for manual handling, wherein the exception handler hides the documents involved in the jam that have a flag set.

* * * * *